United States Patent
Edmonson et al.

(10) Patent No.: US 7,158,763 B2
(45) Date of Patent: Jan. 2, 2007

(54) MULTI-IDT SAW HYBRID COMMUNICATION SYSTEM

(75) Inventors: Peter J. Edmonson, Hamilton (CA); Colin K. Campbell, Ancaster (CA)

(73) Assignee: P. J. Edmonson Ltd., Hamilton (CA)

( * ) Notice: Subject to any disclaimer, the term of this patent is extended or adjusted under 35 U.S.C. 154(b) by 734 days.

(21) Appl. No.: 10/428,094

(22) Filed: May 2, 2003

(65) Prior Publication Data

US 2004/0219880 A1 Nov. 4, 2004

(51) Int. Cl.
*H04B 1/40* (2006.01)

(52) U.S. Cl. ............ 455/88; 455/80; 455/562.1; 455/101; 455/102; 455/121; 333/193; 333/195; 333/194; 310/313 B; 310/313 A; 310/313 D; 310/313 R; 375/150; 375/151; 375/153; 342/51; 342/60; 342/42

(58) Field of Classification Search ............ 455/88, 455/80, 121; 310/313, 10.1, 313 A; 342/51, 342/60; 333/193, 195; 375/151, 150, 152, 375/153

See application file for complete search history.

(56) References Cited

U.S. PATENT DOCUMENTS

| | | | |
|---|---|---|---|
| 6,384,698 B1 * | 5/2002 | Hayashi et al. ............ 333/195 |
| 6,462,698 B1 * | 10/2002 | Campbell et al. ............ 342/51 |
| 6,469,598 B1 * | 10/2002 | Tsuzuki et al. ............ 333/193 |
| 6,541,893 B1 * | 4/2003 | Zhu et al. ............ 310/313 B |
| 6,683,515 B1 * | 1/2004 | Nakamura et al. ............ 333/193 |
| 6,720,847 B1 * | 4/2004 | Nako et al. ............ 333/193 |
| 6,798,318 B1 * | 9/2004 | Abbott et al. ............ 333/195 |
| 6,816,036 B1 * | 11/2004 | Takamine ............ 333/195 |
| 6,825,794 B1 * | 11/2004 | Edmonson et al. ............ 342/51 |
| 6,828,878 B1 * | 12/2004 | Takamine et al. ............ 333/193 |
| 6,900,577 B1 * | 5/2005 | Takamine ............ 310/313 D |
| 7,005,964 B1 * | 2/2006 | Edmonson et al. ............ 340/10.1 |

* cited by examiner

*Primary Examiner*—Marceau Milord
(74) *Attorney, Agent, or Firm*—Robert F. Delbridge (57) ABSTRACT

A SAW communication device has a main IDT mounted on an SAW substrate to receive an RF signal received by an antenna and convert the RF signal to an acoustic wave which travels along the SAW substrate in opposite directions from the main IDT. At least two secondary IDTs are mounted on the SAW substrate on opposite sides of and spaced from the main IDT to receive and reflect the acoustic wave in a modulated form such that the modulated acoustic wave from one secondary IDT is delayed relatively to the modulated acoustic wave from a secondary IDT on the opposite side of the main IDT to the one secondary IDT. The main IDT is also operable to receive and convert the reflected modulated acoustic waves to a further RF signal with a concatenated waveform corresponding to the two modulated acoustic waves and transmit the further RF signal from the antenna.

10 Claims, 6 Drawing Sheets

MULTI-IDT SAW HYBRID COMMUNICATION SYSTEM

FIELD OF INVENTION

This invention relates to multi-IDT SAW hybrid communication systems.

BACKGROUND OF INVENTION

Remote passive wireless sensors or radio frequency identification devices (RFID) have typically primarily consisted of either all semiconductor or of all surface acoustic wave (SAW) components. The major disadvantage of semiconductor-based RFID devices is the high, typically 5 Watt RF power level which the base transceiver must emit to activate the device. Even at such a significant power level, the distance between the base and a remote sensor may be limited to 1 meter or less. The major advantage of semiconductor devices is their flexibility in programming and read/write memory capabilities. SAW sensors have somewhat opposite characteristics. Their major advantage is that they only require typically 5 mW of RF power to communicate 1 meter. Their disadvantages are that they currently have neither programming flexibility nor any write memory capabilities nor any read/write memory.

It is therefore an object of the invention to provide a hybrid communication system which maximizes the advantages and minimizes the disadvantages of both semiconductor and SAW components.

SUMMARY OF INVENTION

According to the invention, a SAW communication device has a main IDT mounted on an SAW substrate to receive an RF signal received by an antenna and convert the RF signal to an acoustic wave which travels along the SAW substrate in opposite directions from the main IDT, and at least two secondary IDTs mounted on said SAW substrate on opposite sides of and spaced from the main IDT to receive and reflect said acoustic wave in a modulated form such that the modulated acoustic wave from one secondary IDT is delayed relatively to the modulated acoustic wave from a secondary IDT on the opposite side of the main IDT to said one secondary IDT. The main IDT is also operable to receive and convert the reflected modulated acoustic waves to a further RF signal with a concatenated waveform corresponding to the two modulated acoustic waves and transmit said further RF signal from the antenna.

This invention provides a hybrid system which captures the advantages of both SAW and semiconductor structures. With this system, it is possible to use a small battery or energy source rather than depending on RF signal conversion to derive energy for the semiconductor circuitry. The advantages of this hybrid system also include low RF complexity requirements for the transceiver and flexibility in programming with read/write memory abilities.

The present invention provides a multi-IDT SAW hybrid communication system with a low power wireless radio frequency (RF) transceiver capable of exchanging information over distances ranging from less than one meter to tens of meters. The main radio transmitter and receiver components have passive surface acoustic wave (SAW) devices. Interdigital transducers (IDTs) are configured to replicate a given signal and then modulate each signal separately. This procedure eliminates the need, at the receiver, to generate a local reference signal from an on-board oscillator. Furthermore, due to the geometric nature of the IDTs during a transmit signal excitation process, a spreading of the signal spectrum occurs. Additionally, a processing gain is obtained during the reception and the detection process within the IDTs. Ancillary analogue and digital circuitry are associated with the IDTs to assist in the collection, processing and transfer of information between systems. This multi-IDT SAW hybrid communication system can be configured to allow for either Mbps of data between a few transceiver devices or Kbps of data between hundreds of transceiver devices.

The multi-IDT SAW hybrid communication system in accordance with the invention is particularly suited for low power, low bit rate ZigBee type of applications such as sensors, read/write RFID tags, toys, wireless wallets, hearing aids, industrial and biomedical applications and automobile or other transportation apparatus and intelligent homes operating in the 400 MHz, 900 MHz or 2500 MHz frequency regions. Multi-IDT SAW hybrid communication devices in accordance with the invention are particularly suited for Ad-Hoc or mesh type networks where information is convened over large distances using strings of short-ranged devices. Wireless mesh networks have the positive attributes of being self-configuring, scalable and self-healing. Multi-IDT SAW hybrid communication devices in accordance with the invention are also ideal for such network applications because each device can behave either as a master and initiate a data transfer, or as a slave and respond to a data transfer. A multitude of such multi-IDT SAW hybrid communication devices can be distributed for data acquisition and control purposes.

DESCRIPTION OF THE DRAWINGS

Embodiments of the invention will now be described, by way of example, with reference to the accompanying drawings, of which.

DESCRIPTION OF PREFERRED EMBODIMENT

Figure 1:
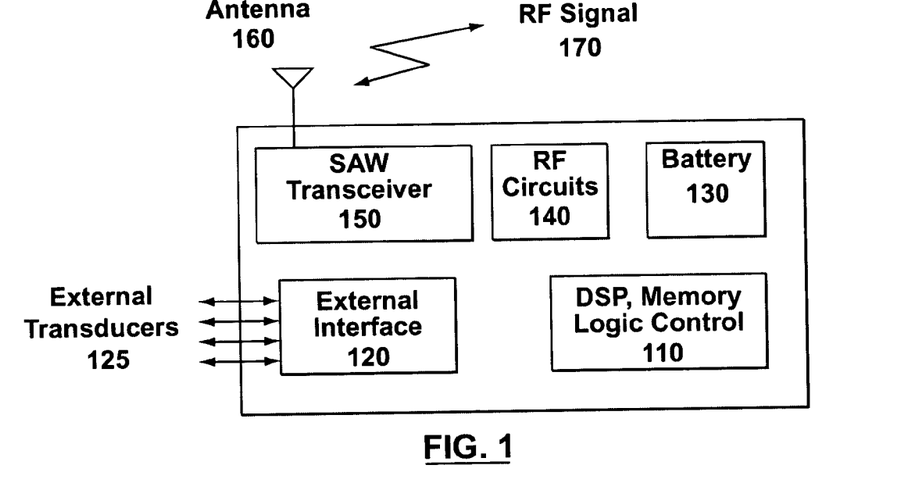
FIG. 1 is a schematic view of a multi-IDT SAW hybrid wireless communication device.

Referring to the drawings, FIG. 1 is a schematic view of a multi-IDT SAW hybrid communication device. The device includes a digital signal processor (DSP), memory and logic control 110, an external interface 120, external transducers 125, battery 130, RF circuits 140, SAW transceiver 150 and an antenna 160. The purpose of this hybrid device is to exchange data via an RF signal 170.

Figure 2:
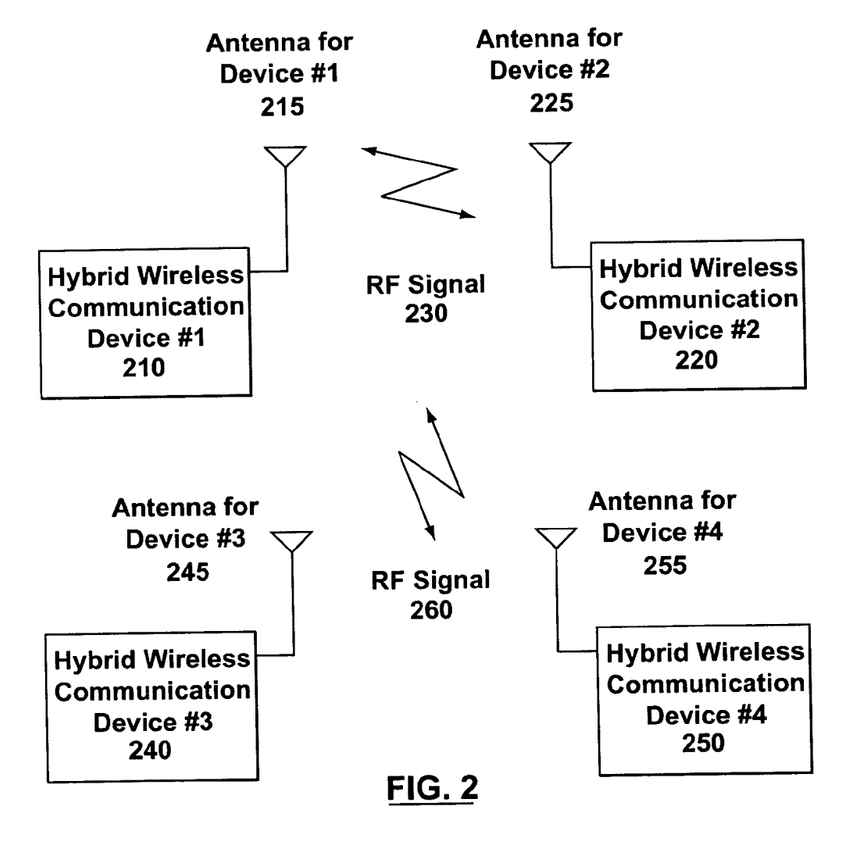
FIG. 2 is a similar view of a hybrid wireless communication system with four multi-IDT SAW hybrid communication devices of the kind shown in FIG. 1.

An example of a hybrid wireless communication system using four such communication devices is shown in FIG. 2. Any of the communication devices can initiate a data transfer session. For a prearranged system which is dictated by a chosen protocol in which only two devices communicate with each other, the first device 210 initiates an RF interrogation signal 230 via its antenna 215 which propagates to the second device 220 and is detected by its antenna 225. The communication sequence continues with data information within the second device 220 being modulated on to two separate acoustic waves which were originally excited by the RF signal 230. Two concatenated data signals then leave the second device 220 via its antenna 225 and are propagated to the first device 210 via its antenna 215 for processing. A similar scenario would include third and fourth devices 240–250 and a chosen protocol among all devices which would implement frequency division, time division, or an encoding division multiple access scheme, or a combination thereof, to support numerous data transfer modes.

Another possible configuration is to combine three or four multi-IDT SAW hybrid communication devices in a one-way multi-cast scenario. For example, one device 210 would broadcast simultaneously a predetermined RF signal 230 and a predetermined RF signal 260 to the other devices 220, 240 and 250. The other devices would then detect the predetermined the RF signal 230 and 260 to decode data information using a detector circuit.

Figure 3:
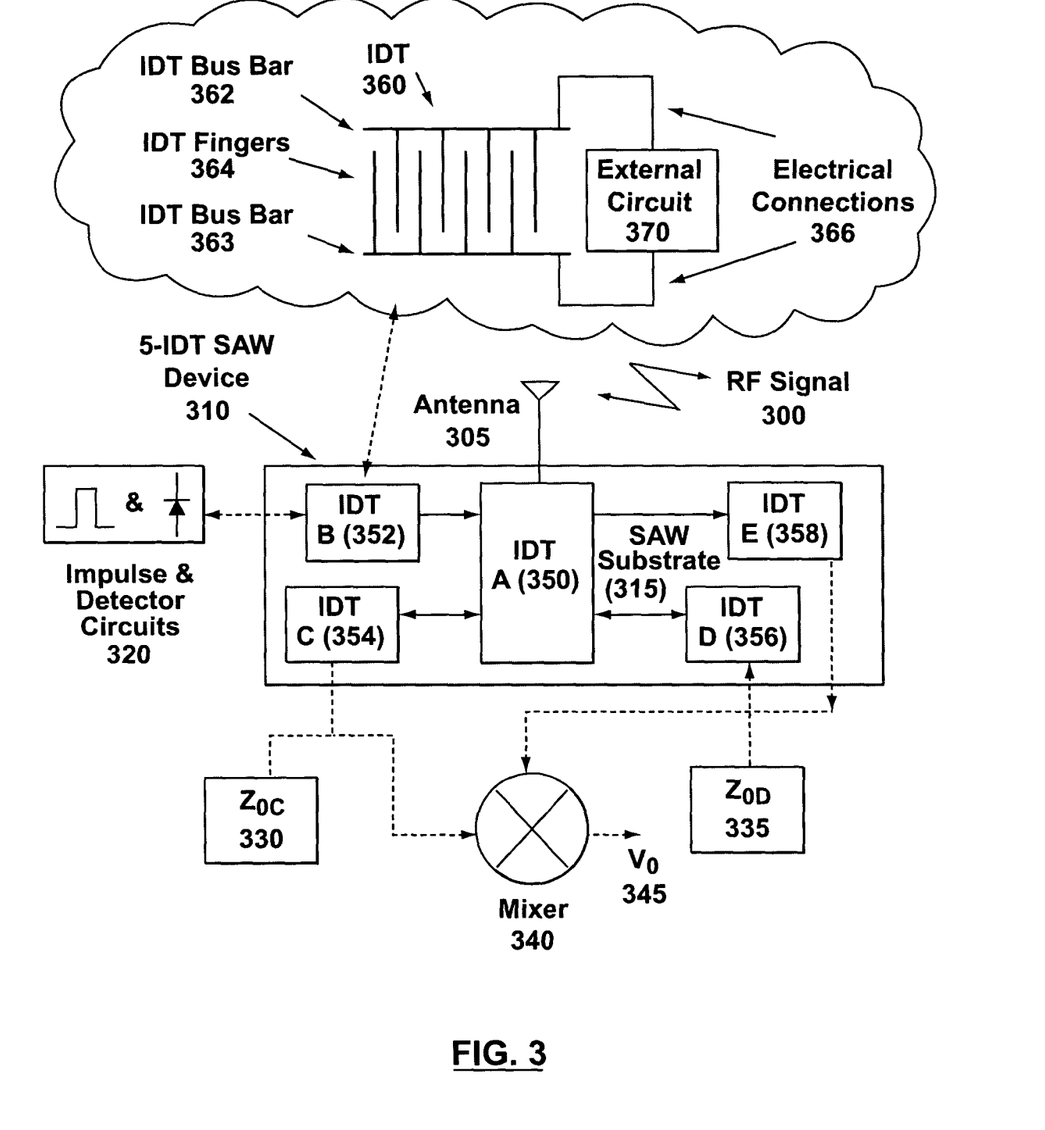
FIG. 3 is a similar view of a five-IDT SAW hybrid communication device with external impedance and mixer.

One of the positive attributes associated with this hybrid system is that the SAW communication devices can transmit, receive and respond to a data stimulus by modulating an acoustic wave and retransmit an RF signal all passively on a piezoelectric substrate. FIG. 3 schematically demonstrates as an example a passive five interdigital transducer (5-IDT) SAW device 310 fabricated on a piezoelectric substrate 315 with some ancillary external circuitry such as an antenna 305, external impulse and detector circuit 320, impedance circuits 330 & 335 and an RF mixer 340. The impulse circuit 320 is activated when the SAW communication device functions as the initial inquiry transmitter, and the impedance circuits 330 & 335 and RF mixer 340 are switched in during the receive mode. The positioning of the various SAW IDTs, IDT A 350, IDT B 352 and IDT D 356 to allow for the correct time synchronization of both the reflected waves of the interrogated device and IDT C 354 and IDT E 358 acting as inputs to the mixer is very critical. A suitable dual track technique which enables the distribution of acoustic waves to achieve synchronization and minimize the device length is described in U.S. Provisional Patent Application No. 60/370,207 filed Apr. 8, 2002 and the subsequent complete application Ser. No. 10/400,656 filed Mar. 28, 2003. The contents of these applications are hereby incorporated herein by reference.

SAW IDT 360 has two bus bars 362, 363 which run parallel to the acoustic wave propagation of the piezoelectric substrate 315 and fingers 364 which extend perpendicularly to the two bus bars 362 and 363. One bus bar 362 is designated as electrically hot and the other bus bar 363 is electrically grounded. This configuration can be transposed to suit the nature of the device. The fingers 364 are alternately connected to the hot bus bar 362 or to the grounded bus bar 363. The number of IDT fingers 364 will depend on the device and system parameters. Two adjacent fingers 364 constitute a finger pair Np. Two electrical connections 366 connect each bus bar 362, 363 to an external circuit 370 which varies depending upon the requirements of each separate IDT.

To initiate a communication session, IDT B 352 of the first device 210 is excited by an impulse circuit 320 which is controlled by the DSP 110. This impulse initiates an electrical-to-mechanical transformation within the IDT and causes a frequency selective acoustic wave to propagate towards IDT A 350. The acoustic wave, as it propagates beneath the IDT, transforms to a frequency selected electrical RF signal 300 by a mechanical-to-electrical transformation. The RF signal 300 is then propagated by means of an antenna 305 which is connected to IDT A 350 of the first device 210.

Figure 4:
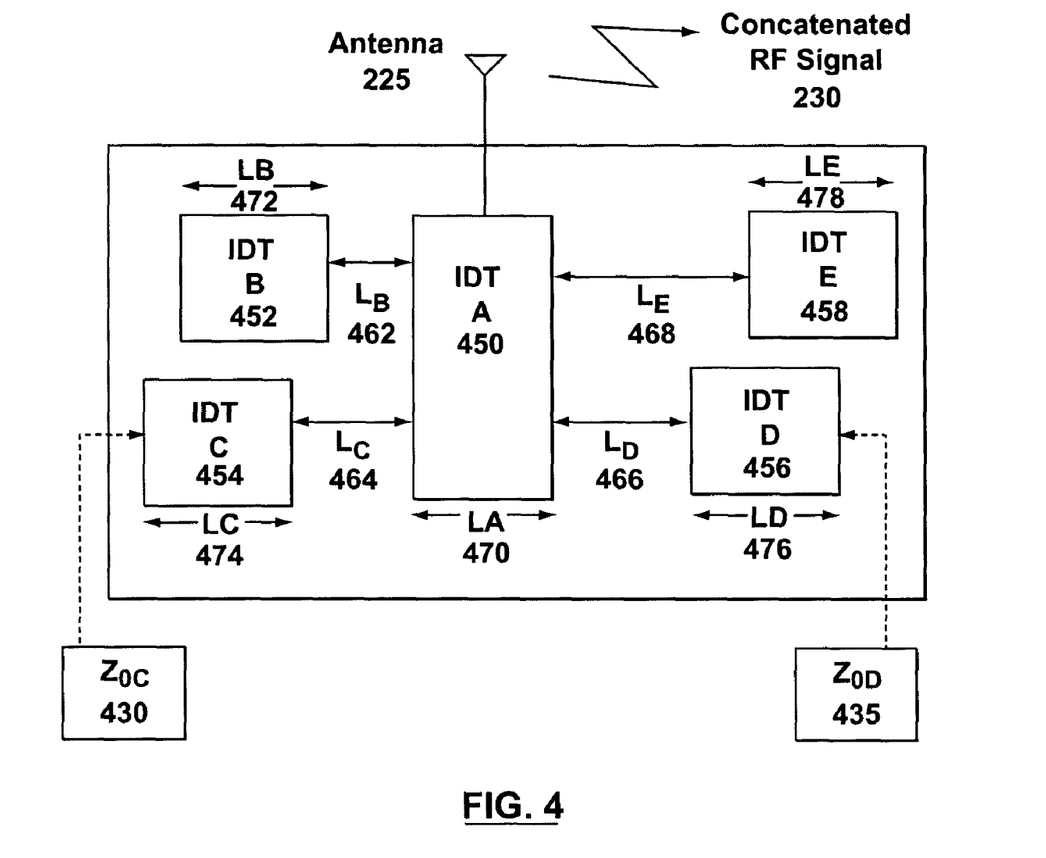
FIG. 4 is a similar view of the communication device indicating IDT lengths (L) and IDT distances ($L_B$, $L_C$, $L_D$, $L_E$) with respect to IDT A.

The second 5-IDT communication device 220 is located within range of the first transmit device 210 and receives the RF signal 230 via the antenna 225 attached to IDT A of the second device 220. A reciprocal electrical-to-mechanical transformation takes place with the excited IDT A 450 and produces an acoustic wave which propagates outwardly in opposite directions towards IDTs C 454 and D 456 as shown FIG. 4. These IDTs are configured during this period as reflectors at their acoustic ports by controlling the termination impedance 430,435 attached to their electrical ports. The acoustic reflection is governed by the acoustic reflection coefficient $P_{11}'$ defined by, $$P_{11}' = P_{11} - \frac{P_{13}P_{31}}{Y_L P_{33}} \quad (1)$$

where $P_{11}$ is the reflection coefficient at acoustic port 1, $P_{13}$ is the transfer parameter from acoustic port 1 to the electrical port 3, $P_{31}$ is the transfer parameter from the electrical port 3 to the acoustic port 1, $P_{33}$ is the transfer parameter at the electrical port 3 and $Y_L$ is the load admittance connected to the electrical port 3.

The relationship between the load impedance ZL and load admittance, YL is, $$Z_L = \frac{1}{Y_L} \quad (2)$$

The phase of $P_{11}'$, can then be controlled by the load impedance ZL such as when $Z_L$ tends towards a short circuit, $Z_L=0$ Ω the phase of $P_{11}'$, $\phi_1 \approx 180°$ and when $Z_L$ tends towards an open circuit, $Z_L > 10000$ Ω the phase of $P_{11}'$, $\phi_2$ approaches 90°.

The acoustic wave reflected from IDT D 456 is then modulated with a phase shift of either $\phi_1$ or $\phi_2$ or, while the acoustic wave reflected from IDT C 454 is modulated with a constant phase shift of $\phi_2$.

The reflected phase modulated acoustic wave from IDT C 454 returns back to IDT A 450 with the acoustic wave being converted to an RF signal 230 and is transmitted from the second device 220 via the antenna 225 attached to IDT A 450. A time delayed second RF signal is also transmitted from the second device 220 which has also been phase modulated from IDT D 456. The time delay is due to the longer acoustic path $L_D$ 466 between IDT A 450 and IDT D 456 when compared to the acoustic path $L_C$ 464 between IDT A 450 and IDT C 454. The length of each IDT is also critical for the correct time synchronization of the acoustic waves and also impacts the overall bit rate of the system.

Lengths LA 470, LB 472, LC 474, LD 476 and LE 478 are calculated to optimise the impulse characteristics IDT B 452, convolution processes IDT A 450 with IDT C 454 and IDT E 458 and the reflection properties of IDT C 454 and IDT D 456.

Figure 5:
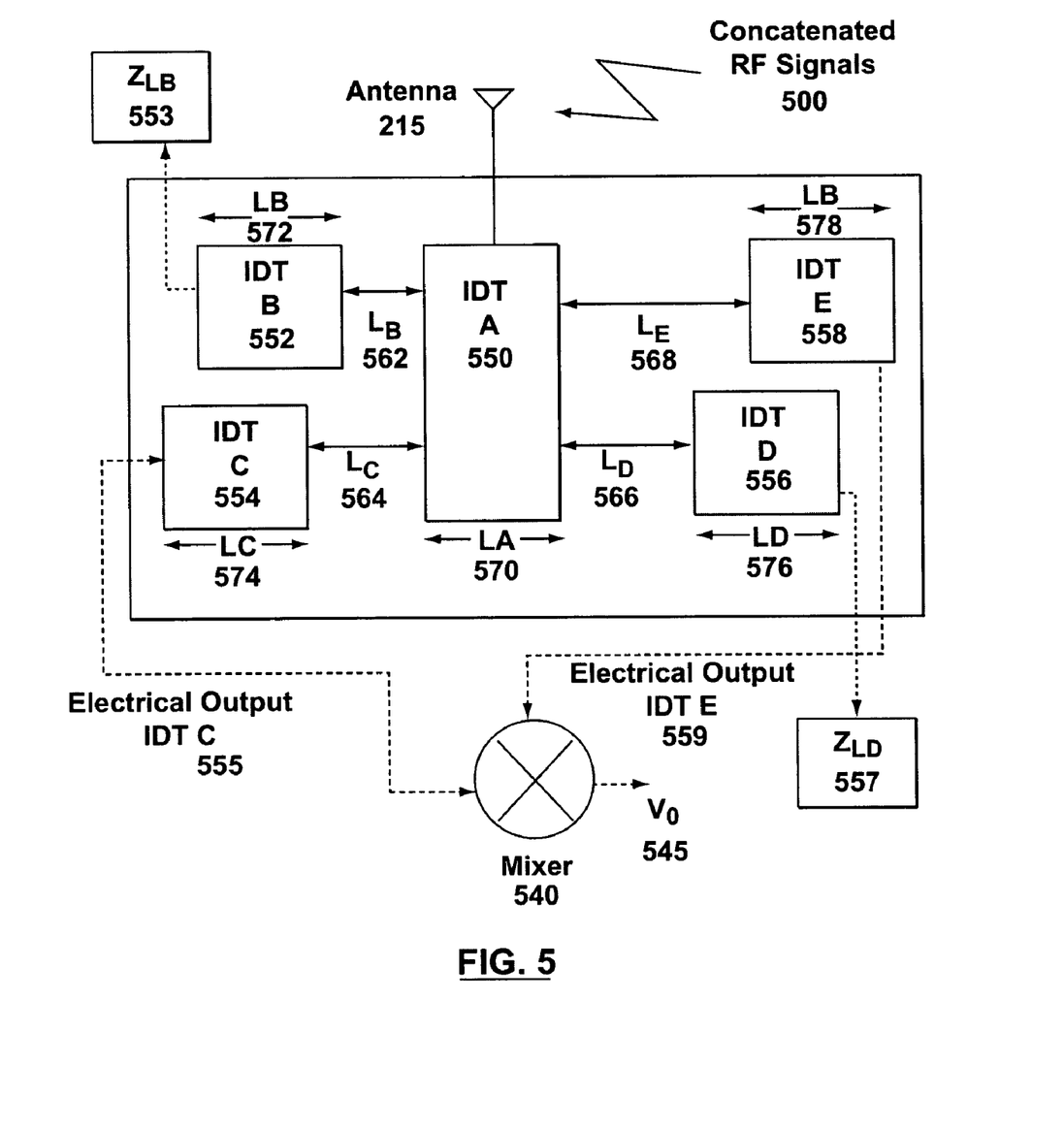
FIG. 5 is a similar view of the communication device indicating the electrical terminations of IDT B, IDT C, IDT D and IDT E.

The two concatenated RF signals 400 transmitted from the second device 220 are then received at the first device 210 via the antenna 215 attached to IDT A 550 as shown in FIG. 5. The acoustic waves generated by IDT A 550 propagate in opposite directions towards IDT E 558 on one acoustic track and towards IDT C 554 on the other acoustic track. The acoustic waves at IDTs B 552 and IDT D 556 are not used as their termination impedances $Z_{LB}$ 553 and $Z_{LD}$ 557 minimize any reflections. The concatenated acoustic waves that interact with IDT C 554 and IDT E 558 do so simultaneously because of the acoustic distances $L_C$ 564 and $L_E$ 568. The electrical outputs 555, 559 of IDT C 554 and IDT E 558 are used as the two inputs for the external active mixer 540 to produce an output signal $V_\theta$ 545.

Figure 6:
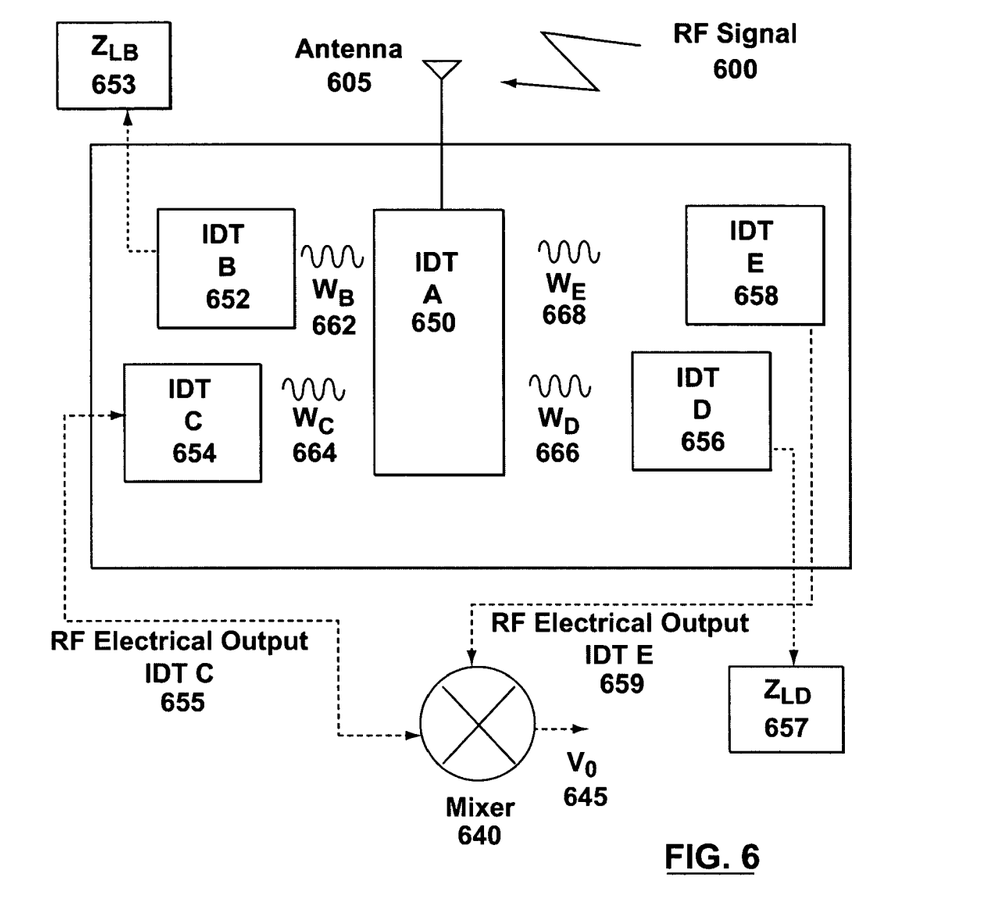
FIG. 6 is a similar view of the communication device indicating the steps to transmit and receive the signal between two such devices.

The steps to transmit and receive a signal between two 5-IDT hybrid communication devices are summarized as follows using FIG. 6 as a reference. Due to the convolution process as an acoustic wave passes through an IDT, there is an elongation of the original impulse waveform $W_B$ 662 emitting from IDT B 652. The following steps assume an initial chip rate of 40 chips which transforms into 40 finger pairs for the structure of IDT B 652.

Steps to transmit and receive a signal between two 5-IDT devices:

1. Impulse IDT B 652 on the first device which produces 40 chips.
2. Acoustic wave $W_B$ 662 propagates from IDT B 662 to IDT A 650.
3. Convolution of acoustic wave $W_B$ 662 with IDT A 650 to produce 79 chips.
4. RF signal 600 is radiated from antenna 605 that is electrically attached to IDT A 650.
5. RF signal 600 of chip length 79 arrives at the second device.
6. Antenna 605 that is electrically attached to IDT A 650 of the second device receives RF signal 600 of chip length 79.
7. IDT A 650 is excited by RF signal 600 to produce acoustic waves $W_B$ 662, $W_C$ 664, $W_D$ 666 and $W_E$ 668 each with 118 chips in length.
8. One acoustic wave $W_C$ 664 propagates towards IDT C 654 and the other acoustic wave $W_D$ 666 propagates a greater distance to IDT D 656.
9. Acoustic wave $W_C$ 664 reflects from IDT C 654 with a phase offset of $\phi_2$, due to the acoustic reflection coefficient $P_{11}'$, back to IDT A 650.
10. Acoustic wave $W_D$ 666 reflects from IDT D 656 with a phase offset of $\phi_1$, back to IDT A 650.
11. Acoustic wave $W_C$ 664 convolves with IDT A 650 to produce 157 chips.
12. Acoustic wave $W_D$ 666 arrives slightly later and convolves with IDT A 650 to produce 157 chips.
13. RF signal 600 that is comprised of two concatenated waveforms is radiated from the antenna 605 that is electrically attached to IDT A 650 of the second device.
14. RF signal 600 arrives back at device #1 via the antenna 605 that is electrically attached to IDT A 650.
15. IDT A 650 is excited by RF signal 600 to produce an acoustic wave of 196 chips.
16. Acoustic wave $W_C$ 664 of 196 chips propagates towards IDT C 654, and the other acoustic wave $W_E$ 668 also of 196 chips travels a greater distance to IDT E 658.
17. The acoustic waves $W_B$ 662 and $W_D$ 666 propagating towards IDT B 662 and IDT D 656 respectively are not used, with the termination impedances $Z_{LB}$ 553 and $Z_{LD}$ 557 suitably chosen to minimize any reflections.
18. The leading waveform of acoustic wave $W_C$ 664 convolves with IDT C 664 but the acoustic wave $W_E$ 668 has not arrived yet at IDT E 668.
19. The leading waveform of acoustic wave $W_E$ 668 convolves with IDT E 658 to produce an RF electrical signal 659 of 235 chips in length.
20. The trailing waveform of acoustic wave $W_C$ 664 convolves with IDT C 654 to produce an RF electrical signal 655 of 235 chips in length.
21. The two RF electrical signals 655 and 659 are the inputs to a mixer 640 configured as a phase detector.
22. A signal $V_\theta$ 645 contains both the sum (2fo) and difference (DC) components of the two RF electrical signals 655 and 659.

These steps enable data information to be exchanged from the second device back to the first device. A simple protocol implementing a time division access scheme enable the simple bi-directional transfer of data between two or more devices.

Figure 7:
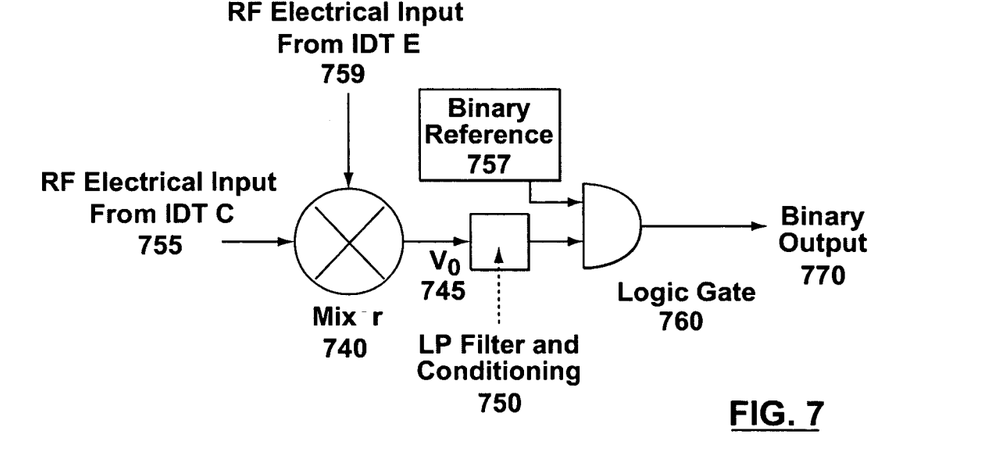
FIG. 7 is a similar view of a demodulation circuit.

The multi-IDT hybrid communication system implements certain active circuitry to realize and enhance its performance. Examples of this circuitry may include a mixer, filters, logic circuits, switches and amplifiers. FIG. 7 illustrates the key elements of the demodulation circuit. The two RF electrical signals 755 and 759 from the SAW IDTs are the inputs to the RF mixer 740. The mixer 740 is configured as a phase detector whose voltage output $V_\theta$ 745 contains both the DC component and the second harmonic of the fundamental frequency. This second harmonic is removed and the DC component is both amplified and level shifted as required by the low pass (LP) filter and conditioning circuit 750.

The DC component $V_\theta$ 745 output of the mixer 740 is a result of the phase difference between the two input signals. The DC component $V_\theta$ 745 of the output of the mixer 740 is a negative maximum when there is a minimum of phase difference (0°) or a positive maximum when there is a maximum of phase difference (180°) between the two input signals. Conversely, the DC component $V_\theta$ 745 of the output of the mixer 740 reduces to a minimum ($V_\theta=0$ volts) as the phase difference approaches 90° between the two input signals. Depending on the value of the binary reference 757, the logic gate 760 would produce a binary output 770 depending on the phase offset of the two RF electrical signals 755 and 759 from the SAW IDTs.

Figure 8:
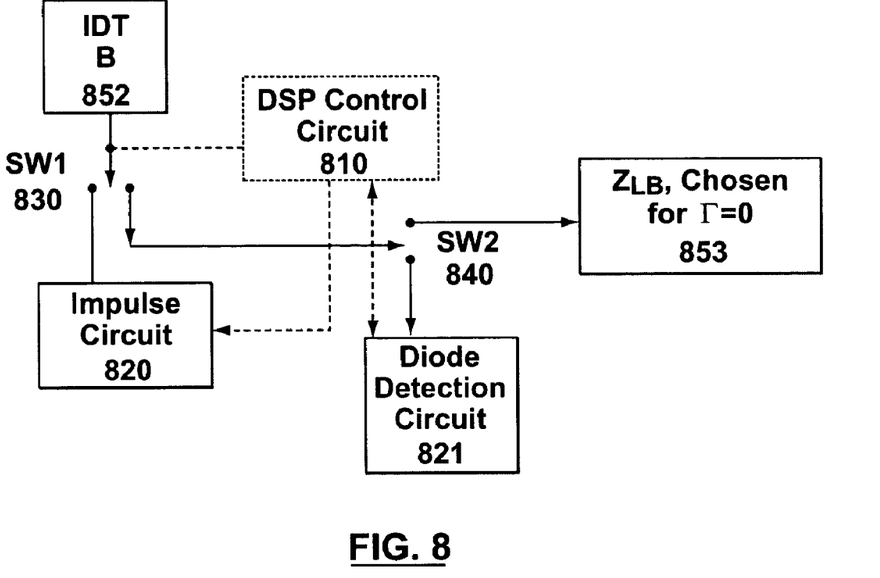
FIG. 8 is a similar view of a switch arrangement for IDT B.

The use of RF switches is significant in the function of the multi-IDT SAW hybrid communication system. FIG. 8 outlines an example of how a configuration of switches allows IDT B 852 to perform several multi functions such as an acoustic wave source when impulsed, a termination of acoustic waves when the reflector is configured with $\Gamma=0$ and also as a signal detector. A sequential communication event commences when the DSP control circuit 810 directs the switch SW1 830 to move into a position to connect the impulse circuit 820 to IDT B 852. An electrical impulse to the SAW IDT initiates the electrical-to-mechanical transformation which produces acoustic waves. In another scenario, IDT B 852 acts as an acoustic absorber by having the DSP control circuit 810 sequentially control switches SW1 830 and SW2 840 and the load $Z_{LB}$ 853 of IDT B 852 to produce a reflection coefficient Γ=0. This prevents any acoustic waves generated by IDT A 650 from reflecting from IDT B 852 back into IDT A 650 and causing self-interference. The default position for SW1 830 and SW2 840 electrically connects IDT B 852 with the diode detection circuit 821. This configuration allows the communication device to sit idle for long periods of time. When queried by a similar communication device, it detects a predetermined RF signal sequence which initiates an internal progression of events which powers up and activates the device. This method is more power efficient than using a wake-up protocol to query any surrounding devices for missed data transfers.

Another use of the diode detection circuit 821 is to combine three or more multi-IDT SAW hybrid communication systems in a multi-cast scenario. One device would send out a predetermined RF signal sequence to other similar devices. These other devices would then detect the predetermined RF signal to decode data information using the diode detection circuit 821.

Amplifier modules increase the link budget capabilities and when implemented in the antenna path increase the RF range of this system. The RF path losses for 400 MHz, 900 MHz and 2500 MHz frequencies are dictated by;

$$Gpathloss = -20\log\left(\frac{4\pi d}{\lambda}\right) \quad (3)$$

where d=distance in meters and λ=wavelength at centre frequency fo.

Figure 9:
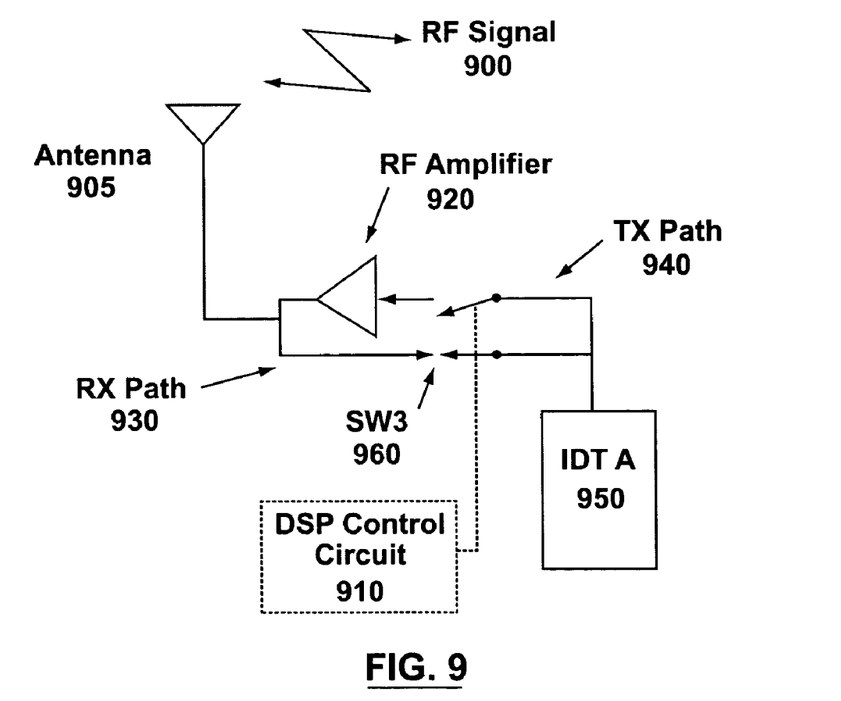
FIG. 9 is a similar view of a switch arrangement for IDT A, with a ganged switch in default receive mode.

One of the distinctive features of this multi-IDT SAW hybrid communication system is that it requires that IDT A functions both as a transmit and receive transducer. FIG. 9 illustrates an example of IDT A 950 either transmitting or receiving an RF signal 900. The default position of the double pole switch configuration SW3 960 electrically connects IDT A 950 via the RX path 930 to the antenna 905 to receive the RF signal 900. During the session sequence, the switch SW3 960 is controlled by the DSP control circuit 910 and switched to the TX path 940 which electrically connects IDT A 950 to the RF amplifier 920, which is electrically connected to the antenna 905. This method provides a discontinuity at SW3 960 for the RX path 930 and does not permit any of the RF signals at the output of the RF amplifier 920 to feedback to IDT A 950.

The usable bit rate potential of the multi-IDT SAW hybrid communication system, is dependent on several variables both at the device and system level. At the device level, one variable is the number of finger pairs Np to be used in the SAW IDTs. The larger the Np values, the greater the time duration of the corresponding acoustic wave and the longer the convolution interval. Another variable which affects both the device characteristics and system utilization is the centre frequency fo. As the centre frequency increases, the acoustic wavelength of the SAW device proportionally decreases. This allows the size of the SAW device to inversely scale with frequency. Therefore as the frequency increases the SAW size decreases, resulting in smaller time duration of the acoustic wave and a shorter convolution interval. These factors lead to a bit rate which scales with centre frequency. The system utilization of centre frequency determines which frequency band the system may operate in. Multi-IDT SAW hybrid communication systems in accordance with the invention may operate in, but not be limited to the 400 MHz, 900 MHz or 2500 MHz frequency regions.

To illustrate the system variability of the possible usable bit rate, the following example is presented. For this example, it can be assumed that the acoustic velocity of the SAW substrate v≈4000 m/s and the centre frequency fo=2.5 $10^9$ Hz. The acoustic wavelength is λ=v/fo, λ=1.6 µm, and the number of IDT single finger pairs, Np=40, which is equivalent to 40 chips, is chosen to produce a transducer length L=40λ≈64 µm. The time t it takes for the acoustic wave to travel this length is t=L/v, ≈16 ns. For this example, the acoustic lengths of the IDTs of FIG. 5; LA 570, LB 572, LC 574, LD 576 and LE 578 are all equal and equal to 40λ≈64 µm. The distances between IDTs are $L_B$ 562=20λ≈32 µm, $L_C$ 564=80λ≈128 µm, $L_D$ 566=200λ≈320 µm and $L_E$ 568=320λ≈512 µm.

Therefore the bit rate is ≈3.9 Mbps for the one-way exchange of data from the second device 220 to the first device 210 or in a multi-cast network where one device broadcasts to multiple devices. A time domain multiple access (TDMA) protocol may be implemented to allow for a full bi-directional rate of 1.95 Mbps between two multi-IDT SAW hybrid communication devices. Alternately, up to 64 devices could communicate with a bit rate of ≈50 Kbps using a TDMA protocol. More devices added to the network would further reduce the bit rate but still allow the useful transfer of low-data rate information.

The acoustic distances between IDTs can be calculated to assure signal synchronization as the first segment of the concatenated signal arrives at IDT E and simultaneously as the second segment of the concatenated signal arrives at IDT C as follows:

Total path of First Segment $L_B+2L_C+L_E$

Total path of Second Segment $L_B+2L_D+L_C$ resulting in $L_E=2L_C+4(LB)$ and $L_D=1.5L_C+2(LB)$; where $L_C \geq 2(LB)$ and LB is the length of the impulsed IDT B.

For a more optimum detection scheme with an increased processing gain, lengths LC 574 and LE 578 should be lengthened to ≈2.5 times that of the impulsed IDT B 552. Therefore LC 574=LE 578=2.5LB 572.

By extending the lengths of LC and LE, the stretched signal that is caused by the convolution process "fits" under the extended IDT C and IDT E.

It will thus be noted that particular advantages and features of the described embodiments are described as follows:

1. The acoustic wave signal is replicated by taking advantage of the bi-directional propagation of the acoustic waves from an electrically excited IDT and then modulating each acoustic wave separately. One of the replicated waves may be used as an RF reference signal used for the demodulation of the data.

2. RF Amplifier in the transmit (TX) branch which is switched on only when transmitting may be used, therefore reducing battery power. The default is for the amplifier to be bypassed to directly connect the antenna to an IDT for the reception and detection of RF signals. This permits the device to be readily available to receive RF signals without depending upon system wake-up protocols to turn on the radio.

3. There is no requirement for a local oscillator in the receive portion of the transceiver. A reference signal can be provided in the demodulator circuit as both inputs to the mixer are derived from the replicated acoustic wave and then each separately modulated.

4. The multi-IDT SAW hybrid communication system devices need not be master/slave based, so that any multi-IDT SAW hybrid device can initiate or respond to a data transfer session. This feature is advantageous for applications where a multi-cast network can provide any single multi-IDT SAW hybrid device to simultaneously broadcast the same data to all other devices that are in range.

Other advantages and embodiments of the invention will now be readily apparent to a person skilled in the art, the scope of the invention being defined in the appended claims.

The invention claimed is:

1. A SAW communication device having:
   a main IDT mounted on an SAW substrate to receive an RF signal received by an antenna and convert the RF signal to an acoustic wave which travels along the SAW substrate in opposite directions from the main IDT, and
   at least two secondary IDTs mounted on said SAW substrate on opposite sides of and spaced from the main IDT to receive and reflect said acoustic wave in a modulated form such that the modulated acoustic wave from one secondary IDT is delayed relatively to the modulated acoustic wave from a secondary IDT on the opposite side of the main IDT to said one secondary IDT,
   the main IDT also being operable to receive and convert the reflected modulated acoustic waves to a further RF signal with a concatenated waveform corresponding to the two modulated acoustic waves and transmit said further RF signal from the antenna.

2. A SAW communication device according to claim 1 wherein at least one of the secondary IDTs has a load impedance which is variable to modify the phase of the reflection coefficient thereof.

3. A SAW communication device according to claim 1 wherein said one secondary IDT is a difference distance from the main IDT than the secondary IDT on the opposite side of the main IDT to effect said delay.

4. A SAW communication device according to claim 1 wherein at least one of said secondary IDTs has the capability of being electrically impulsed to generate an acoustic wave.

5. A SAW communication device according to claim 1 wherein at least one of said secondary IDTs has the capability of being electrically connected to a circuit which can detect a predetermined RF signal.

6. A SAW communication device according to claim 1 wherein said one secondary IDT and said opposite secondary IDT are electrically connected as inputs to an RF mixer configured as a phase detector.

7. A SAW communication device according to claim 6 wherein one of the inputs functions as a reference signal to avoid the necessity of providing a local oscillator.

8. A SAW communication device according to claim 6 wherein the RF mixer has an output arranged to be provided as a binary logic output.

9. A SAW communication device according to claim 1 wherein two electrical paths are provided between the main IDT and the antenna, and a switch operable to select either path is provided.

10. A SAW communication device according to claim 1 wherein an RF amplifier which is switched on only when said further RF signal is being transmitted is provided.

* * * * *